(12) United States Patent
Nowicki (10) Patent No.: US 12,152,714 B2
(45) Date of Patent: Nov. 26, 2024

(54) FLUID CONNECTION ASSEMBLY

(71) Applicant: Oetiker NY, Inc., Lancaster, NY (US)

(72) Inventor: Eric Nowicki, Buffalo, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 18/246,593

(22) PCT Filed: Oct. 26, 2020

(86) PCT No.: PCT/US2020/057312
§ 371 (c)(1),
(2) Date: Mar. 24, 2023

(87) PCT Pub. No.: WO2022/093166
PCT Pub. Date: May 5, 2022

(65) Prior Publication Data
US 2023/0366496 A1   Nov. 16, 2023

(51) Int. Cl.
*F16L 37/08* (2006.01)
*F16L 37/12* (2006.01)

(52) U.S. Cl.
CPC ................. *F16L 37/1225* (2013.01)

(58) Field of Classification Search
CPC ....... F16L 37/08; F16L 37/12; F16L 37/1205; F16L 37/1225; F16L 37/138; F16L 19/02; F16L 19/0231; F16L 19/025; F16L 19/06; F16L 19/065; F16L 21/06
See application file for complete search history.

(56) References Cited

U.S. PATENT DOCUMENTS

| | | |
|---|---|---|
| 4,640,534 A | 2/1987 | Hoskins et al. |
| 4,753,458 A | 6/1988 | Case et al. |
| 5,297,818 A | 3/1994 | Klinger |
| 5,459,500 A | 10/1995 | Klinger et al. |
| 5,468,028 A | 11/1995 | Olson |
| 5,472,242 A | 12/1995 | Petersen |
| 5,584,411 A | 12/1996 | Channell et al. |
| 5,647,612 A | 7/1997 | Yoshida et al. |

(Continued)

FOREIGN PATENT DOCUMENTS

| | | |
|---|---|---|
| CN | 104884853 | 9/2015 |
| CN | 111594624 | 8/2020 |

(Continued)

*Primary Examiner* — Aaron M Dunwoody
(74) *Attorney, Agent, or Firm* — Harter Secrest & Emery LLP; Michael Nicholas Vranjes (57) ABSTRACT

A fluid connection assembly, including a connector body, including a first end, a second end, a first through-bore, and a first radially outward facing surface comprising a first groove, and a retainer removably connected to the connector body, the retainer including a first section, including a third end engaged with the first groove, a fourth end, a first flange arranged between the third end and the fourth end, a first male connector, and a first female connector, and a second section, including a fifth end engaged with the first groove, a sixth end, a second flange arranged between the fifth end and the sixth end, a second male connector arranged to engage with the first female connector, and a second female connector arranged to engage with the first male connector, wherein, in a locked state the first flange and the second flange abut against the second end.

20 Claims, 5 Drawing Sheets

(56) References Cited

U.S. PATENT DOCUMENTS

| | | |
|---|---|---|
| 5,681,061 A | 10/1997 | Olson |
| 5,842,450 A | 12/1998 | Fort et al. |
| 5,909,901 A | 6/1999 | Zillig et al. |
| 5,979,946 A | 11/1999 | Petersen et al. |
| 6,481,086 B1 | 11/2002 | Davidson |
| 6,880,859 B2 | 4/2005 | Breay et al. |
| 6,913,294 B2 | 7/2005 | Treverton et al. |
| 7,128,347 B2 | 10/2006 | Kerin |
| 7,240,930 B2 | 7/2007 | Stravitz |
| 7,300,078 B2 | 11/2007 | Yamamoto et al. |
| 7,364,207 B2 | 4/2008 | McGee et al. |
| 7,497,477 B2 | 3/2009 | Pepe |
| 7,631,905 B2 | 12/2009 | McGee et al. |
| 7,802,822 B2 | 9/2010 | Poder et al. |
| 7,828,338 B2 | 11/2010 | Kertesz et al. |
| 7,963,570 B2 | 6/2011 | Swift et al. |
| 8,375,550 B2 | 2/2013 | Swift et al. |
| 10,221,976 B2 | 3/2019 | Kujawski et al. |
| 10,273,996 B2 | 4/2019 | Whitaker et al. |
| 10,281,075 B2 | 5/2019 | Hontz et al. |
| 10,738,926 B2 | 8/2020 | Stieler |
| 11,092,269 B2 | 8/2021 | Kujawski, Jr. et al. |
| 2004/0094958 A1* | 5/2004 | Treverton ............... F16L 21/06 285/23 |
| 2008/0111376 A1 | 5/2008 | Ferrero |
| 2009/0091125 A1 | 4/2009 | Takeda et al. |
| 2009/0119886 A1 | 5/2009 | Werth |
| 2010/0032937 A1 | 2/2010 | Kerin et al. |
| 2011/0006517 A1 | 1/2011 | Nakata |
| 2011/0101674 A1 | 5/2011 | Benvenuto et al. |
| 2012/0104746 A1 | 5/2012 | Fansler et al. |
| 2014/0210202 A1 | 7/2014 | Hess et al. |
| 2016/0363247 A1 | 12/2016 | McCure |
| 2017/0114935 A1 | 4/2017 | Kujawski, Jr. et al. |
| 2017/0254453 A1 | 9/2017 | Fremont et al. |
| 2018/0328525 A1 | 11/2018 | Kerin, Jr. |
| 2019/0063656 A1 | 2/2019 | Kujawski, Jr. |
| 2022/0049731 A1 | 2/2022 | You |

FOREIGN PATENT DOCUMENTS

| | | |
|---|---|---|
| CN | 212251624 | 12/2020 |
| DE | 102011121828 A1 | 6/2013 |
| EP | 1939514 | 7/2008 |
| EP | 3361134 | 8/2018 |
| EP | 3430302 | 4/2020 |
| JP | H 08-277983 A | 10/1996 |
| JP | 2008-082463 A | 4/2008 |
| JP | 2008-520932 A | 6/2008 |
| JP | 2008-281190 A | 11/2008 |
| JP | 2009-103303 A | 5/2009 |
| JP | 4703885 | 6/2011 |
| JP | 5743765 | 7/2015 |
| JP | 2016-070434 A | 5/2016 |
| JP | 2017-096494 A | 6/2017 |
| JP | 2019-011862 A | 1/2019 |
| JP | 2020-514635 A | 5/2020 |
| JP | 2021001626 | 1/2021 |
| WO | 2006-055668 A2 | 5/2006 |
| WO | 2018-127750 A1 | 7/2018 |

* cited by examiner

FLUID CONNECTION ASSEMBLY

CROSS REFERENCE TO RELATED APPLICATIONS

The present application is the U.S. National Stage Application pursuant to 35 U.S.C. § 371 of International Patent Application No. PCT/US2020/057312, filed on Oct. 26, 2020, which application is hereby incorporated by reference in its entirety.

FIELD

The present disclosure relates to fluid connectors, and, more particularly, to a fluid connection assembly including a retainer that decreases the insertion force required for assembly and allows for quick assembly without the need for tools.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, in order for the fluid connector to properly function, slots or apertures must be machined in the connector body such that the retaining clip can protrude therethrough and engage the tube, which requires extra post-process manufacturing. During the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process.

Thus, there has been a long-felt need for a fluid connection assembly including a retainer that allows for disassembly, eliminates the need for post-process machining, and reduces the insertion force required to assemble the fluid connector.

SUMMARY

According to aspects illustrated herein, there is provided a fluid connection assembly, comprising a connector body, including a first end, a second end, a first through-bore, and a first radially outward facing surface comprising a first groove, and a retainer operatively arranged to be removably connected to the connector body, the retainer including a first section, including a third end engaged with the first groove, a fourth end, a first flange arranged between the third end and the fourth end, a first male connector, and a first female connector, and a second section, including a fifth end engaged with the first groove, a sixth end, a second flange arranged between the fifth end and the sixth end, a second male connector arranged to engage with the first female connector, and a second female connector arranged to engage with the first male connector, wherein, in a locked state the first flange and the second flange abut against the second end.

In some embodiments, the first section further comprises a third flange extending radially inward at the third end, the third flange arranged to engage the first groove. In some embodiments, the fluid connection assembly further comprises a tube including a shoulder, wherein the retainer is arranged to secure the tube to the connector body. In some embodiments, the first section further comprises a second groove adjacent the first flange, the second groove arranged to engage the shoulder. In some embodiments, in the locked state, the first flange abuts against the shoulder. In some embodiments, in the locked state, the shoulder is arranged outside of the connector body. In some embodiments, the first section further comprises a second radially outward facing surface and the first male connector comprises a radially inward extending projection. In some embodiments, the first male connector is arranged tangent to the second radially outward facing surface. In some embodiments, the second section further comprises a third radially outward facing surface, the second female connector comprises a second groove, and the radially inward extending projection is arranged to engage the second groove. In some embodiments, the first section further comprises a radial surface extending from the third end to the fourth end, and the male component extends from the radial surface.

According to aspects illustrated herein, there is provided a fluid connection assembly, comprising a connector body, including a first end, a second end, a first through-bore, and a first radially outward facing surface comprising a first groove, a retainer operatively arranged to be removably connected to the connector body, the retainer including a first section, including a third end engaged with the first groove, a fourth end, a first flange arranged between the third end and the fourth end, a first male connector, and a first female connector, and a second section, including a fifth end engaged with the first groove, a sixth end, a second flange arranged between the fifth end and the sixth end, a second male connector arranged to engage with the first female connector, and a second female connector arranged to engage with the first male connector, and a tube including a shoulder, wherein, in a locked state the retainer secures the tube to the connector body, and the first flange and the second flange abut against the second end and the shoulder.

In some embodiments, the first section further comprises a third flange extending radially inward at the third end, the third flange arranged to engage the first groove. In some embodiments, the first flange comprises a first diameter, the third flange comprises a second diameter, and the second diameter is greater than the first diameter. In some embodiments, the first section further comprises a second groove arranged on a first axial side of the first flange to connect the retainer to the connector body, and a third groove arranged on a second axial side of the first flange to engage the shoulder and connect the retainer to the tube. In some embodiments, in the locked state, the shoulder is arranged outside of the connector body and axially spaced from the second end. In some embodiments, the first section further comprises a second radially outward facing surface, and the first male connector comprises a radially inward extending projection. In some embodiments, the first male connector is arranged tangent to the second radially outward facing surface. In some embodiments, the second section further comprises a third radially outward facing surface, the second female connector comprises a second groove, and the radially inward extending projection is arranged to engage the second groove. In some embodiments, the second female connector further comprises a protrusion arranged in the second groove and extending radially outward, and the radially inward extending projection is arranged to engage the protrusion. In some embodiments, the first section further comprises a radial surface extending from the third end to the fourth end, and the male component extends from the radial surface.

According to aspects illustrated herein, there is provided a fluid connection assembly comprising a two-piece snap on retainer that allows for quick securement of a tube to a connector body, by hand, without the need for tools. The fluid connection assembly of the present disclosure is faster than alternatives, requires no tools, and is tamper resistant. In some embodiments, the retainer comprises two pieces made of a polymer (i.e., plastic) that snap together. The two pieces interact with the tube and an exterior groove on the connector body.

According to aspects illustrated herein, there is provided a fluid connection assembly comprising a two-piece plastic retainer, wherein both plastic pieces are identical and snap together around both a tube and a connector body including a groove. The two-piece plastic retainer assembly interacts with the groove when snapped together to hold the tube and the connector body together, while allowing the tube to seal (e.g., O-ring) against a seal inside the connector body.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 1:
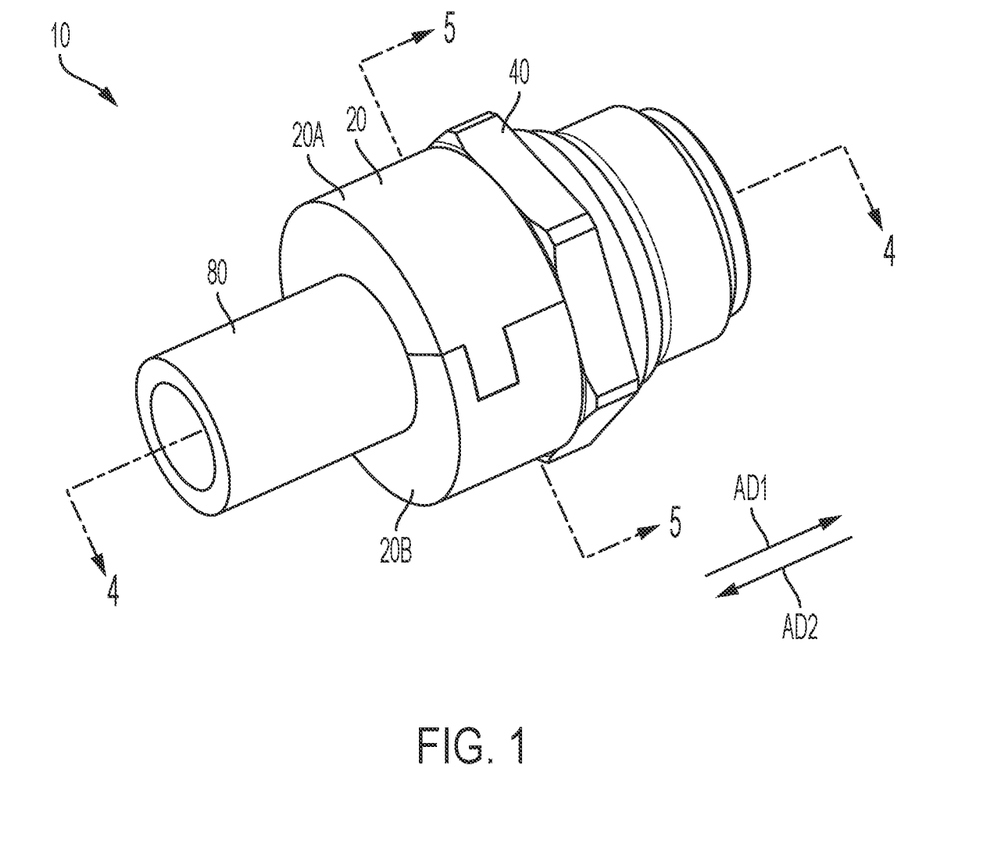
FIG. 1 is a perspective view of a fluid connection assembly, in a locked state.
Figure 2:
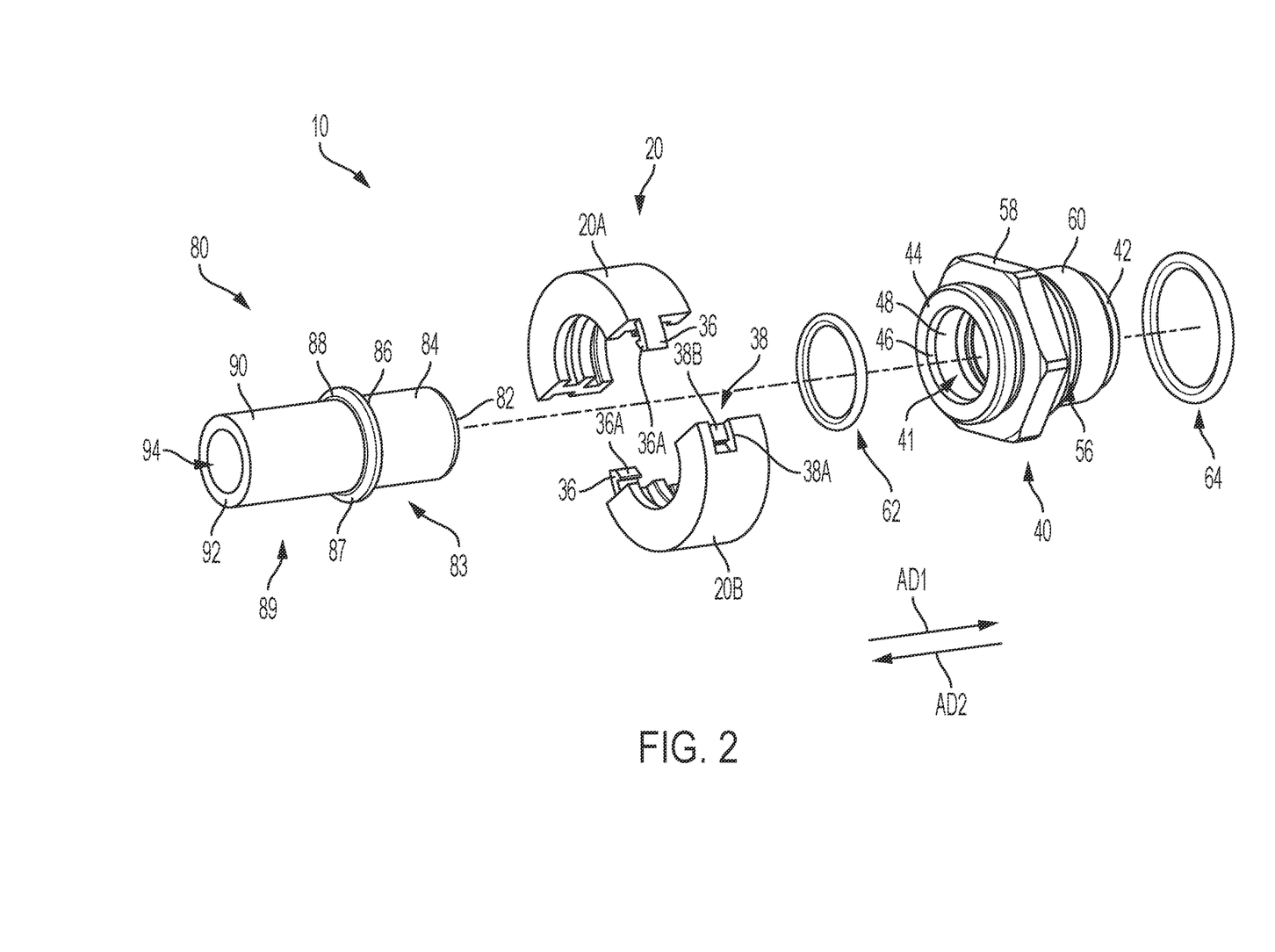
FIG. 2 is an exploded perspective view of the fluid connection assembly shown in FIG. 1.

Adverting now to the figures, FIG. 1 is a perspective view of fluid connection assembly 10, in a locked state. FIG. 2 is an exploded perspective view of fluid connection assembly 10. Fluid connection assembly 10 generally comprises retainer 20, tube 80, and connector body 40. The following description should be read in view of FIGS. 1-2.

Tube 80 comprises end 82, section 83, bead or shoulder 87, section 89, end 92, and through-bore 94. Through-bore 94 extends through tube 80 from end 82 to end 92. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper or curvilinear surface proximate end 82 (see FIG. 4). Shoulder 87 is arranged between section 83 and section 89 and comprises surface 86 and surface 88. In some embodiments, surface 86 is an axial surface facing at least partially in axial direction AD1 and surface 88 is an axial surface facing at least partially in axial direction AD2. In some embodiments, surface 86 is a frusto-conical surface extending from the radially outward facing surface of shoulder 87 radially inward in axial direction AD1. For example, surface 86 may be a linear conical shape and increases in diameter in axial direction AD2. In some embodiments, surface 86 may comprise linear portion and a conical or frusto-conical portion. Section 89 is arranged between shoulder 87 and end 92 and comprises radially outward facing surface 90. Radially outward facing surface 90 includes a substantially constant diameter. Tube 80 is arranged to be inserted, specifically with end 82 first, into connector body 40. Tube 80 is inserted into connector body 40 until section 83, or radially outward facing surface 84, engages seal 62 (see FIG. 4). Shoulder 87 is arranged outside of and axially spaced from connector body 40, at which point retainer 20 is assembled to secure tube 80 to connector body 40, as will be described in greater detail below. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal. In some embodiments, tube 80 comprises a polymer. In some embodiments, tube 80 comprises a ceramic.

Figure 3A:
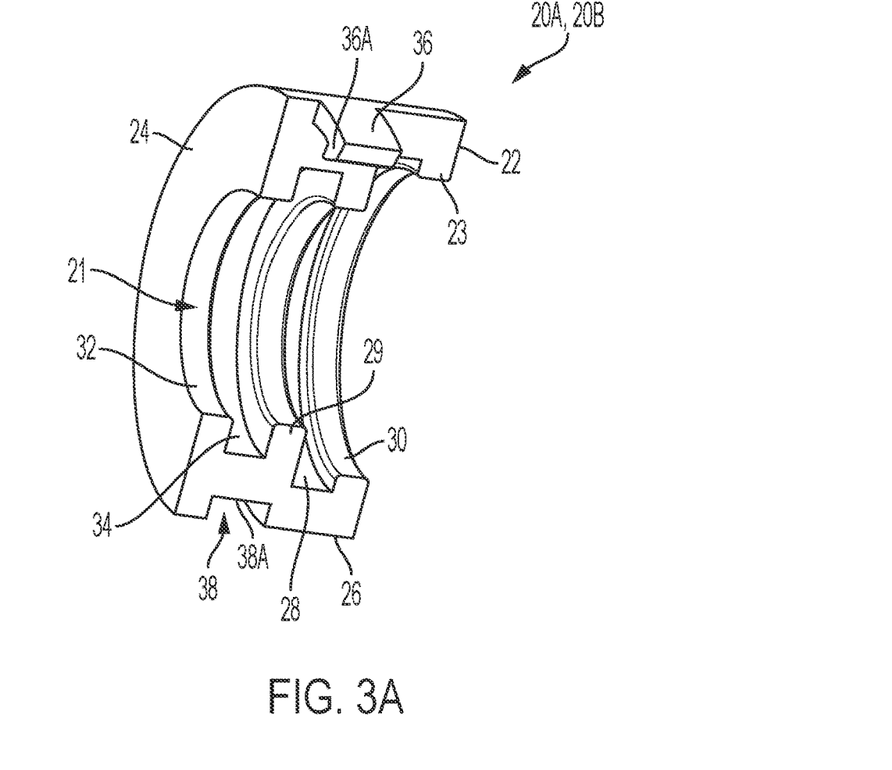
FIG. 3A is a perspective view of a section of the retainer shown in FIG. 1.
Figure 3B:
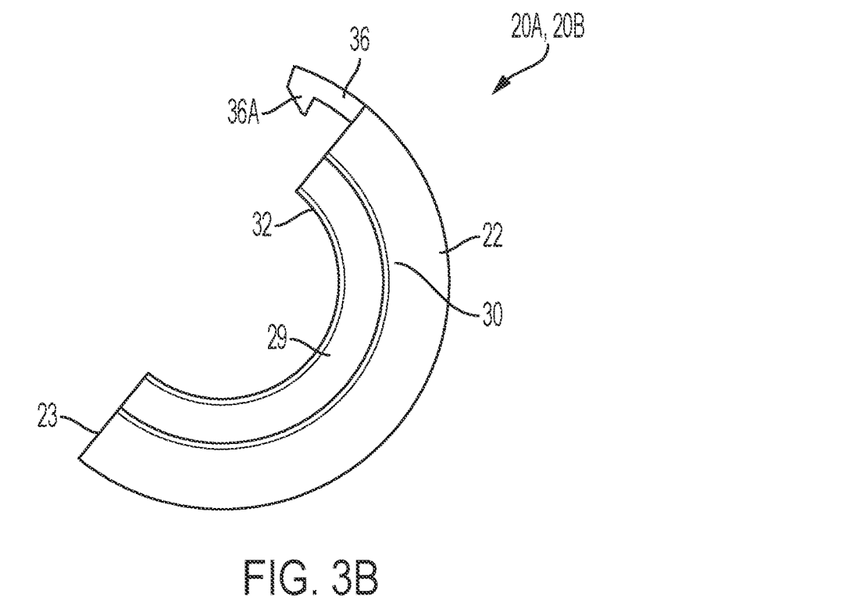
FIG. 3B is an elevational view of the section of the retainer shown in FIG. 3A.
Figure 4:
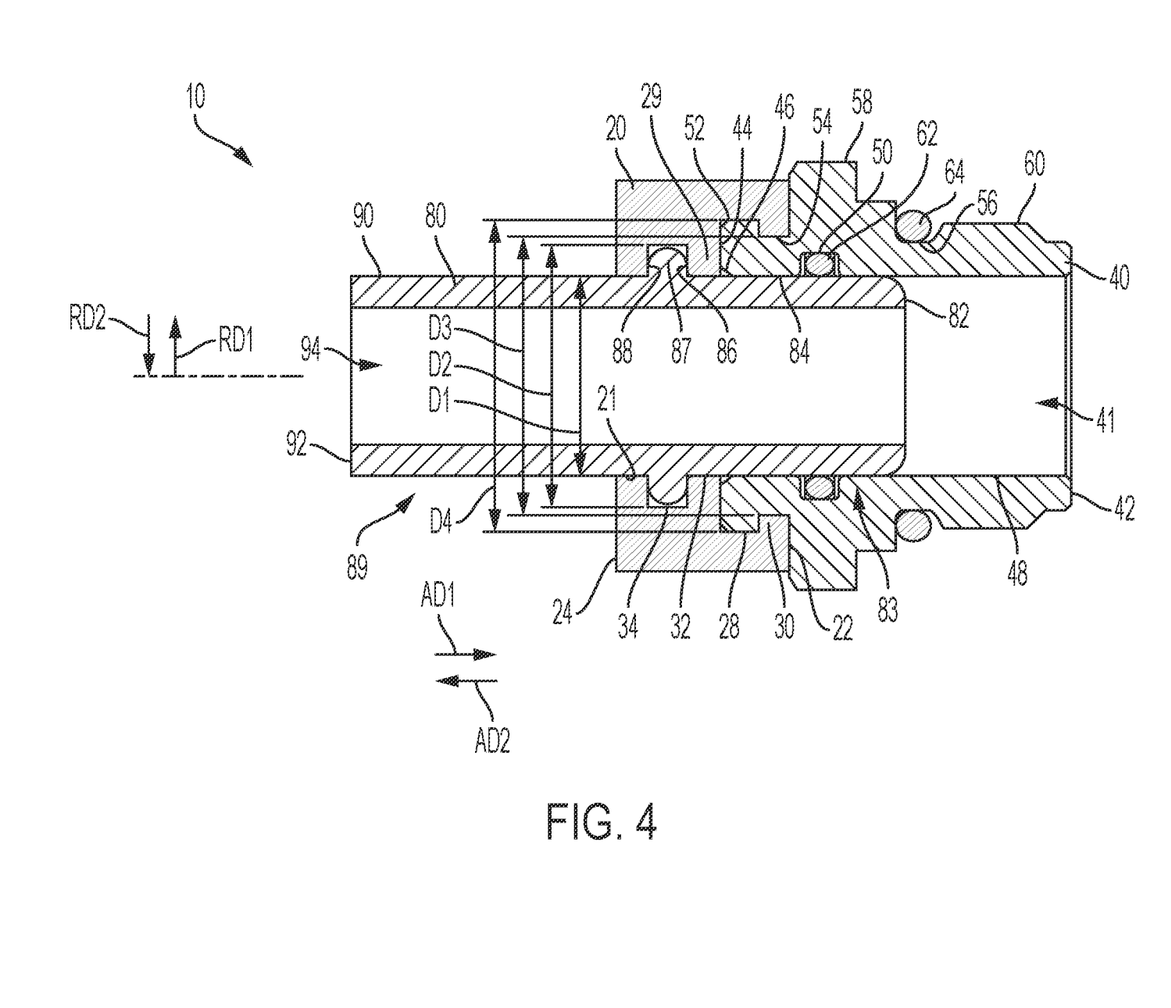
FIG. 4 is a cross-sectional view of the fluid connection assembly taken generally along line 4-4 in FIG. 1; and, FIG. 5 is a cross-sectional view of the fluid connection assembly taken generally along line 5-5 in FIG. 1.
Figure 5:
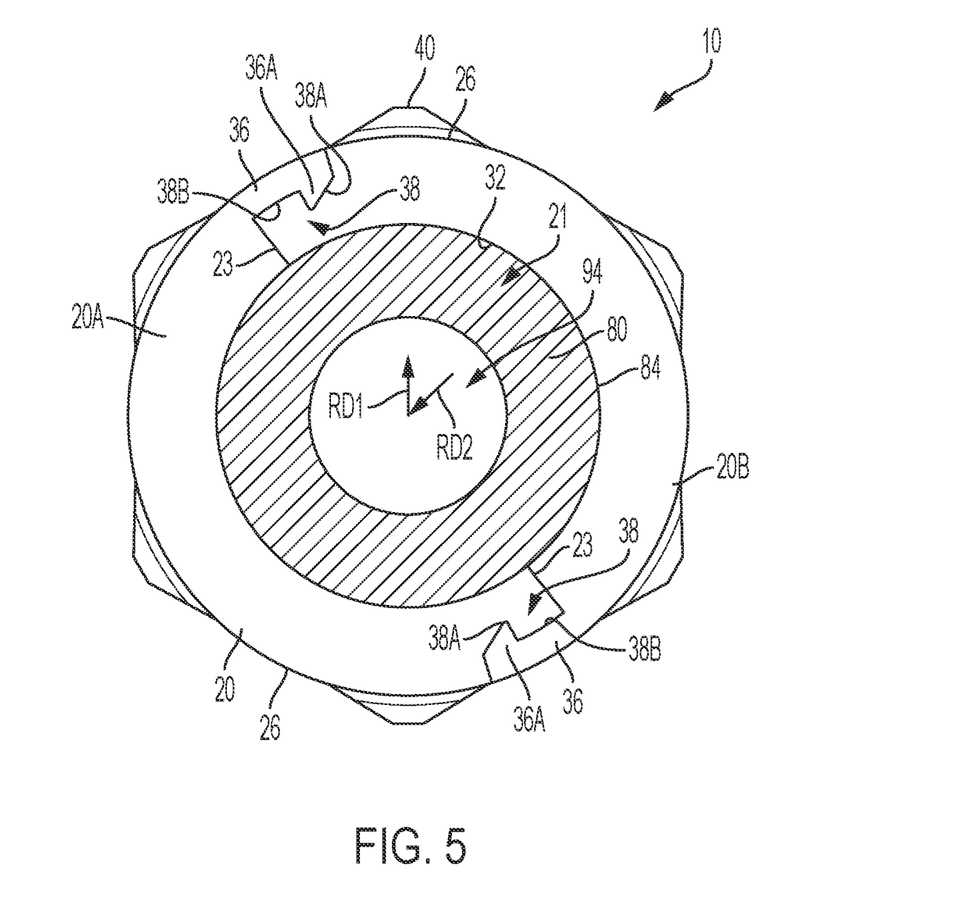

FIG. 3A is a perspective view of section 20A, 20B of retainer 20. FIG. 3B is an elevational view of section 20A, 20B of retainer 20. FIG. 4 is a cross-sectional view of fluid connection assembly 10 taken generally along line 4-4 in FIG. 1. FIG. 5 is a cross-sectional view of fluid connection assembly 10 taken generally along line 5-5 in FIG. 1. The following description should be read in view of FIGS. 1-5.

Retainer 20 generally comprises section 20A and section 20B. In some embodiments, and as shown, section 20A and section 20B are substantially the same. Section 20A, 20B generally comprises end 22, end 24, radial surface 23 connecting end 22 and end 24, hole 21 extending from end 22 to end 24, radially outward facing surface 26, radially inward facing surface 28, and radially inward facing surface 32. Radially inward facing surface 28 extends from end 22 and comprises diameter D4. Radially inward facing surface 28 comprises flange 30 extending radially inward therefrom. Flange 30 is arranged adjacent to end 22 and comprises diameter D3. Flange 30 is operatively arranged to engage groove 54 and radially inward facing surface 28 is operatively arranged to engage radially outward facing surface 52 to connect retainer 20 to connector body 40. Radially inward facing surface 32 extends axially from end 24 to radially inward facing surface 28 and comprises diameter D1. Radially inward facing surface 32 is connected to radially inward facing surface 28 via an axial surface which is arranged to abut against end 44 when retainer is fully connected to connector body 40 (see FIG. 4). Radially inward facing surface 32 comprises groove 34 arranged between end 24 and radially inward facing surface 28. In some embodiments, groove 34 arranged between and spaced apart from end 24 and radially inward facing surface 28. Groove 34 comprises diameter D2. Groove 34 is operatively arranged to engage shoulder 87 to connect retainer 20 to tube 80. Section 20A, 20B comprises center flange 29 which separates groove 34 and radially inward facing surface 28. Center flange 29 generally forms both a first channel (i.e., axially between center flange 29 and flange 30) and a second channel (i.e., channel 34) and is operatively arranged to engage and/or abut against both end 44 of connector body as well as shoulder 87. As best seen in FIG. 4, diameter D4 is greater than diameter D3, diameter D3 is greater than diameter D2, and diameter D2 is greater than diameter D1.

Section 20A, 20B further comprises male connector 36 and female connector 38. As shown, male connector 36 on section 20A is arranged to engage female connector 38 on section 20B and male connector 36 on section 20B is arranged to engage female connector 38 on section 20A such that sections 20A and 20B are fixedly secured. In some embodiments, male connector 36 is hook-shaped and includes projection 36A. Projection 36A extends generally radially inward in radial direction RD2. Male connector 36 extends from radial surface 23 and is arranged tangent to radially outward facing surface 26. In some embodiments, male connector 36 is not arranged tangent to radially outward facing surface 26. In some embodiments, female connector 38 comprises groove 38A arranged in radially outward facing surface 26 and protrusion 38B arranged in groove 38A. Groove 38A extends radially inward, generally in radial direction RD2, into radially outward facing surface 26. Protrusion 38B extends radially outward in radial direction RD1 from groove 38A, but is still radially inward from radially outward facing surface 26.

To connect section 20A and section 20B, male connector 36 is displaced toward female connector 38. As male connector 36 engages female connector 38, projection 36A engages protrusion 38B causing male connector 36 to displace radially outward in radial direction RD1. Once projection 36A passes protrusion 38B, male connector 36 snaps back radially inward in radial direction RD2 and projection 36A engages groove 38A and protrusion 38B thereby locking male connector 36 and female connector 38 together. When section 20A is secured to section 20B, radial surfaces 23 abut against each other.

Connector body 40 comprises through-bore 41 extending from end 42 to end 44, radially inward facing surface 46, radially inward facing surface 48, groove 50, radially outward facing surface 52, groove 54, head 58, and radially outward facing surface 60. Connector body 40 is arranged to be connected to a component that is filled with a fluid or through which fluid flows. For example, connector body 40 may be connected to a refrigeration compressor or a transmission via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed into is a condenser, evaporator, or pump. It should be appreciated that fluid connector 10 may be used in various other components, assemblies, and subassemblies in which fluid connection is desired. Radially outward facing surface 60 may further comprise groove 56. Seal or O-ring 64 is arranged in groove 56 to create a fluid tight seal between connector body 40 and the component it is connected to. Seal 62 is arranged in connector body 40. Specifically, seal 62 is arranged in groove 50. Groove 50 is arranged in radially inward facing surface 48. In some embodiments, seal 62 is an O-ring. In some embodiments, and as shown, radially inward facing surface 46 is a frusto-conical surface that connects generally cylindrical radially inward facing surface 48 with end 44. Groove 54 is arranged in radially outward facing surface 52 and comprises diameter D3. Groove 54 is arranged axially between end 44 and head 58. In some embodiments, groove 54 is arranged immediately adjacent to head 58. Groove 54 is operatively arranged to engage with flange 30 to connect retainer 20 to connector body 40. In some embodiments, connector body 40 comprises a metal. In some embodiments, connector body 40 comprises a polymer. In some embodiments, connector body 40 comprises a ceramic.

To assemble fluid connection assembly 10, tube 80 is inserted in axial direction AD1, with end 82 first, into connector body 40. Radially outward facing surface 84 engages seal 62 and section 83 is arranged inside of connector body 40 proximate radially inward facing surface 48. Shoulder 87 is spaced apart from end 44. Then, retainer 20 is secured over both connector body 40 and tube 80. Specifically, section 20A is arranged over connector body 40 and tube 80 such that flange 30 engages groove 54, radially inward facing surface 28 engages radially outward facing surface 52, and groove 34 engages shoulder 87. In some embodiments, radially inward facing surface 32 engages radially outward facing surface 90 and/or radially outward facing surface 84. In some embodiments, the axial surface that connects radially inward facing surface 28 and radially inward facing surface 32 engages end 44. Once section 20A is properly positioned, section 20B is positioned in the same way and is "snapped" into section 20B. By snapped it is meant that male connector 36 of section 20B is first engaged with female connector 38 of section 20A, after which female connector 38 of section 20B is engaged with male connector 36 of section 20A. This connection method creates a snapping effect that ultimately axially secures tube 80 within connector body 40. As best shown in FIG. 4, when fluid connection assembly 10 is fully assembled, shoulder 87 is arranged axially spaced, in axial direction AD2, from end 44. The engagement of retainer 20 with connector body 40 and tube 80 prevents displacement of tube 80 in axial directions AD1 and AD2, as well as radial directions RD1 and RD2, relative to connector body 40.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Retainer
20A Section
20B Section
21 Hole
22 End
23 Surface
24 End
26 Radially outward facing surface
28 Radially inward facing surface
29 Center flange
30 Flange
32 Radially inward facing surface
34 Groove
36 Male connector
36A Projection
38 Female connector
38A Groove
38B Protrusion
40 Connector body
41 Through-bore
42 End
44 End
46 Radially inward facing surface
48 Radially inward facing surface
50 Groove
52 Radially outward facing surface
54 Groove
56 Groove
58 Head
60 Radially outward facing surface
62 Seal
64 Seal
80 Tube
82 End
83 Section
84 Radially outward facing surface
86 Surface
87 Shoulder or bead
88 Surface
89 Section
90 Radially outward facing surface
92 End
94 Through-bore
AD1 Axial direction
AD2 Axial direction
D1 Diameter
D2 Diameter
D3 Diameter
D4 Diameter
RD1 Radial direction
RD2 Radial direction

What is claimed is:
1. A fluid connection assembly, comprising:
a connector body, including:
a first end;

a second end;
a first through-bore; and
a first radially outward facing surface comprising a first groove; and
a retainer operatively arranged to be removably connected to the connector body, the retainer including:
  a first section, including:
    a third end engaged with the first groove;
    a fourth end;
    a first flange arranged between the third end and the fourth end;
    a first male connector; and
    a first female connector; and
  a second section substantially identical to the first section, including:
    a fifth end engaged with the first groove;
    a sixth end;
    a second flange arranged between the fifth end and the sixth end;
    a second male connector arranged to engage with the first female connector; and
    a second female connector arranged to engage with the first male connector;
  wherein in a locked state the first flange and the second flange abut against the second end.

2. The fluid connection assembly as recited in claim 1, wherein the first section further comprises a third flange extending radially inward at the third end, the third flange arranged to engage the first groove.

3. The fluid connection assembly as recited in claim 1, further comprising a tube including a shoulder, wherein the retainer is arranged to secure the tube to the connector body.

4. The fluid connection assembly as recited in claim 3, wherein the second groove is arranged to engage the shoulder.

5. The fluid connection assembly as recited in claim 4, wherein in the locked state, the first flange abuts against the shoulder.

6. The fluid connection assembly as recited in claim 4, wherein in the locked state, the shoulder is arranged outside of the connector body.

7. The fluid connection assembly as recited in claim 1, wherein:
  the first section further comprises a second radially outward facing surface; and
  the first male connector comprises a radially inward extending projection.

8. The fluid connection assembly as recited in claim 7, wherein the first male connector is arranged tangent to the second radially outward facing surface.

9. The fluid connection assembly as recited in claim 7, wherein:
  the second section further comprises a third radially outward facing surface;
  the second female connector comprises a third groove; and
  the radially inward extending projection is arranged to engage the third groove.

10. The fluid connection assembly as recited in claim 1, wherein:
  the first section further comprises a radial surface extending from the third end to the fourth end; and
  the first male connector extends from the radial surface.

11. A fluid connection assembly, comprising:
a connector body, including:
  a first end;
  a second end;
  a first through-bore; and
  a first radially outward facing surface comprising a first groove;
a retainer operatively arranged to be removably connected to the connector body, the retainer including:
  a first section, including:
    a third end engaged with the first groove;
    a fourth end;
    a first flange arranged between the third end and the fourth end;
    a second groove arranged on a first axial side of the first flange;
    a third groove arranged on a second axial side of the first flange;
    a first male connector; and
    a first female connector; and
  a second section, including:
    a fifth end engaged with the first groove;
    a sixth end;
    a second flange arranged between the fifth end and the sixth end;
    a second male connector arranged to engage with the first female connector; and
    a second female connector arranged to engage with the first male connector; and
a tube including a shoulder;
wherein, in a locked state:
  the retainer secures the tube to the connector body; and
  the first flange and the second flange abut against the second end and the shoulder.

12. The fluid connection assembly as recited in claim 11, wherein the first section further comprises a third flange extending radially inward at the third end, the third flange arranged to engage the first groove.

13. The fluid connection assembly as recited in claim 12, wherein the first flange comprises a first diameter, the third flange comprises a second diameter, and the second diameter is greater than the first diameter.

14. The fluid connection assembly as recited in claim 11, wherein:
  the second groove is arranged to connect the retainer to the connector body; and
  the third groove is arranged to engage the shoulder and connect the retainer to the tube.

15. The fluid connection assembly as recited in claim 11, wherein in the locked state, the shoulder is arranged outside of the connector body and axially spaced from the second end.

16. The fluid connection assembly as recited in claim 11, wherein:
  the first section further comprises a second radially outward facing surface; and
  the first male connector comprises a radially inward extending projection.

17. The fluid connection assembly as recited in claim 16, wherein:
  the second section further comprises a third radially outward facing surface;
  the second female connector comprises a fourth groove; and
  the radially inward extending projection is arranged to engage the fourth groove.

18. The fluid connection assembly as recited in claim 17, wherein:
  the second female connector further comprises a protrusion arranged in the fourth groove and extending radially outward; and the radially inward extending projection is arranged to engage the protrusion.

19. The fluid connection assembly as recited in claim 11, wherein:
   the first section further comprises a radial surface extending from the third end to the fourth end; and
   the male component extends from the radial surface.

20. A fluid connection assembly, comprising:
   a connector body, including:
      a first end;
      a second end;
      a first through-bore; and
      a first radially outward facing surface comprising a first groove; and
   a retainer operatively arranged to be removably connected to the connector body, the retainer including:
      a first section, including:
         a third end engaged with the first groove;
         a fourth end;
         a first flange arranged between the third end and the fourth end;
         a first male connector comprising a radially inward extending projection; and
         a first female connector; and
      a second section, including:
         a fifth end engaged with the first groove;
         a sixth end;
         a second flange arranged between the fifth end and the sixth end;
         a second male connector arranged to engage with the first female connector; and
         a second female connector arranged to engage with the first male connector;
   wherein in a locked state the first flange and the second flange abut against the second end.

* * * * *